United States Patent Office 3,531,280
Patented Sept. 29, 1970

3,531,280
HETEROGENEITY BY MIXING DIVERSE POWDERS PRIOR TO CONSOLIDATION
Ralph K. Iler, Wilmington, Del., and Geoffrey W. Meadows, Kennett Square, Pa., assignors to E. I. du Pont de Nemours and Company, Wilmington, Del., a corporation of Delaware
No Drawing. Filed June 23, 1969, Ser. No. 835,815
Int. Cl. C22c 29/00
U.S. Cl. 75—204   2 Claims

ABSTRACT OF THE DISCLOSURE

Dense bodies of tungsten carbide bonded with from 3 to 25% by weight of heterogeneous cobalt-tungsten solid-solution alloy are prepared by intimately mixing a carbon-rich powder containing tungsten carbide with a carbon-deficient powder containing tungsten carbide, either powder also containing cobalt, then heating the mixed powders to a temperature above 1000° C. and consolidating the hot mixture to a density of at least 98% of its theoretical density. The resultant bodies are strong, hard and impact resistant and useful in cutting and shaping very hard materials.

BACKGROUND OF THE INVENTION

This invention relates to a process for preparing tungsten carbide compositions bonded with a heterogeneous cobalt-tungsten solid solution alloy, said process comprising mixing a carbon-rich powder with a carbon-deficient powder prior to densification.

It is shown in Meadows U.S. Pat. No. 3,451,791, that tungsten carbide compositions bonded with a homogeneous cobalt-tungsten alloy have an unusual combination of strength and hardness.

It has been discovered by Iler and Rigby that particular advantages are attendant to such compositions when the cobalt-tungsten alloy is not homogeneous but is heterogeneous as disclosed in their copending application Ser. No. 835,817, filed June 23, 1969.

Various means have been known in the art for adjusting the ratio of carbon:tungsten in cobalt/tungsten carbide compositions. However, such means inherently resulted in a homogeneous ratio. Means for deliberately producing heterogeneity or local variations in carbon:tungsten ratio have not been sought after or publicized.

We have discovered that such variations, which result in heterogeneity in densified compositions, can be induced most simply by mixing a carbon-deficient powder having a carbon:tungsten ratio as low as 0.80 with another powder which is carbon-rich or at least richer in carbon than the carbon-deficient powder and which can have a carbon:tungsten ratio as high as 1.1. Of course, more than two powders can be mixed and the carbon:tungsten ratio can vary for each powder. By this procedure a powder containing heterogeneous carbon:tungsten ratios is obtained and can be used to produce the dense tungsten carbide bodies bonded with heterogeneous cobalt-tungsten alloys described in the above mentioned application Ser. No. 835,817.

SUMMARY

In summary, this invention relates to a process for preparing a dense body of tungsten carbide bonded with from 3 to 25% by weight of a heterogeneous cobalt-tungsten alloy, said alloy consisting essentially of cobalt and an average of from 5 to 25% by weight of tungsten and said alloy comprising regions containing less than 8% by weight of tungsten interspersed with regions containing more than 8% by weight of tungsten, comprising the steps of:

(a) intimately mixing cobalt, a carbon-deficient tungsten carbide powder and a tungsten carbide powder which is not carbon-deficient, the carbon:tungsten ratio of the powders ranging from 0.80 to 1.1;

(b) heating the mixture in an inert atmosphere at a temperature $T_s$ between 1000° C. and $T_h$° C. for from $t_s$ to $20 t_s$ minutes, where $$\log_{10} t_s = \frac{13250}{T_s + 273} - 8.2$$

and $$T_h = \frac{6.5 - \log_{10}(P - 0.3)}{0.0039}$$

wherein P=percent by weight of cobalt;

(c) pressing the hot mixture to a density in excess of 98% of theoretical in a heated zone at a temperature of $T_m$ for a time of from $t_m$ to $20 t_m$ minutes, where $$\log_{10} t_m = \frac{13250}{T_m + 273} - 8.2$$

and $$T_m = \frac{6.5 - \log_{10}(P - 0.3)}{0.0039} \pm 100° C.$$

wherein P=percent by weight of cobalt; and (d) cooling the pressed composition at a rapid rate.

DESCRIPTION OF THE INVENTION

As stated above, this invention is directed to a method for preparing dense bodies of tungsten carbide bonded with from 3 to 25% by weight of heterogeneous cobalt-tungsten alloy, said alloy consisting essentially of cobalt and an average of from 5 to 25% by weight of tungsten and said alloy comprising regions containing more than 8% by weight of tungsten interspersed with regions containing less than 8% by weight of tungsten, the method comprising the steps of (a) intimately mixing cobalt, a carbon-deficient tungsten carbide-containing powder and a tungsten carbide-containing powder which is not carbon deficient, the carbon:tungsten ratio of the powders ranging from 0.80 to 1.1; and then (b) heating; (c) compressing; and (d) cooling the product.

The dense products prepared by this process are more fully described in Iler and Rigby's copending application Ser. No. 835,817 referred to above.

(1) Starting materials

Starting materials for use in this invention are tungsten carbide and cobalt which are substantially pure, that is, containing no more extraneous matter than is found in the tungsten carbide and cobalt powders conventionally employed in making cobalt-bonded tungsten carbide cutting tools. Small amounts of iron, up to 0.5%, may be present from erosion of process equipment; but other than iron, the total impurities amount to less than 0.5% by weight, and preferably are present only in spectroscopically detected amounts.

Fine commercial tungsten carbide having an average grain size in the range of 0.5 to 1 micron may be used. A preferred starting material is colloidally subdivided tungsten carbide powder described in copending application Ser. No. 772,810, filed Nov. 1, 1968. This tungsten carbide is in the form of crystallites of colloidal size well under half a micron in diameter, typically 30 or 40 millimicrons in diameter, the crystallites being linked together in porous aggregates, prepared by forming and precipitating tungsten carbide from a reaction medium of molten salt.

Cobalt suitable for use in this invention includes any source of cobalt metal which can be used to prepare an interdispersion of cobalt with tungsten carbide powder; for example, finely divided powder such as "Cobalt F," sold by the Welded Carbide Tool Co. The metal is preferably more than 99.5% pure cobalt, and should be free from impurities that would be harmful to the properties of cemented tungsten carbide.

(2) Blending components

The cobalt and tungsten carbide powders suitable to be used in this invention must be intimately mixed. Extensive milling of the tungsten carbide with the metal is ordinarily employed to achieve an intimate mixture.

It is preferred to use a mill and grinding material from which a negligible amount of metal is removed, and it is usually preferred to use ballmills or similar rotating or vibrating mills. Suitable materials of construction for such mills are steel, stainless steel, or mills lined with cobalt-bonded tungsten carbide. The grinding medium, which is more susceptible to wear than the mill itself, should be of a hard, wear-resistant material such as a metal-bonded tungsten carbide. Cobalt-bonded tungsten carbide containing about 6% cobalt is a preferred grinding medium. The grinding medium can be in various forms as balls or short cylindrical rods about one-eighth to one-quarter inch in diameter, which have been previously conditioned by running in a mill in a liquid medium for several weeks until the rate of wear is less than .01% loss in weight per day. Mill loadings and rotational speeds should be optimized as will be apparent to those skilled in the art.

In order to avoid caking of the solids on the side of the mill, a sufficient amount of an inert liquid medium is ordinarily used to give a thin slurry of the tungsten carbide powder charged to the mill. One of the liquid media which are suitable for this purpose is acetone.

Ballmilling tungsten carbide in the presence of cobalt reduces the particle size of the tungsten carbide and distributes the cobalt uniformly among the fine particles of carbide. When it is necessary to reduce the particle size of the tungsten carbide it is preferred to mill the tungsten carbide separately prior to interspersing the carbide with cobalt. It is advantageous to start with the preferred colloidal tungsten carbide disclosed in copending application Ser. No. 772,810 referred to above, since it is not necessary to mill the tungsten carbide before it is milled with cobalt.

Milling of cobalt/tungsten carbide mixtures is continued until the cobalt is homogeneously interspersed with the finely divided tungsten carbide. Homogeneous interspersion is evidenced by the fact that it is essentially impossible to separate the cobalt from the tungsten carbide by physical means such as sedimentation or a magnetic field.

The mill is ordinarily fitted with suitable attachments to enable it to be discharged by pressurizing it with an inert gas. The grinding material can be retained in the mill by means of a suitable screen over the exit port. The liquid medium is separated from the milled powder such as by distillation and the powder is then dried under vacuum. Alternatively the solvent can be distilled off directly from the mill. The dry powder is then crushed and screened, while maintaining an oxygen-free atmosphere such as with nitrogen or argon, or by maintaining a vacuum.

(3) Adjusting the carbon:tungsten ratio

Various means are known in the art for adjusting the ratio of carbon:tungsten in cobalt/tungsten carbide compositions. Thus, the ratio can be adjusted by simply adding suitable amounts of finely divided tungsten, ditungsten carbide, or carbon to the mill. For the purposes of this invention, it is necessary to produce a carbon deficiency in the powder compositions which will result in carbon deficient regions in the dense bodies. The term "carbon deficient" will be understood to mean "containing less than one atom of combined carbon per atom of tungsten after consolidation at 1300 to 1500° C."

Carbon deficiency can be produced in tungsten carbide or mixtures of tungsten carbide and cobalt binders by (a) synthesizing tungsten carbide of colloidal particle size such that the surface of the particles consists mainly of tungsten atoms which are not accompanied by corresponding carbon atoms.

(b) making a composition of tungsten monocarbide intermingled with ditungsten carbide or finely divided tungsten metal or phases such as $Co_3W_3C$ or eta phase, in which there is less than one carbon atom per tungsten atom.

(c) oxidizing part of the tungsten or intermingled cobalt to an oxidized form which during subsequent heating with the remaining tungsten monocarbide reacts to form carbon oxides which escape leaving carbon deficient regions in the final product corresponding to the oxidized regions.

If only a small carbon deficiency, such as an atomic ratio of carbon:tungsten of 0.97 or 0.99 is to be created, small amounts of other metals such as tantalum or titanium can be used in place of tungsten. However, in determining the carbon:tungsten ratio in final compositions, the presence of such added metals or their carbides must be taken into account. Of titanium and tantalum, it is preferred to use tantalum because its carbide acts as a grain growth inhibitor, and enhances hardness at high temperature.

(4) Heterogeneity in the powder

Means for deliberately producing heterogeneity or local variations in the carbon:tungsten ratio have not been described in the prior art. Such variations can be produced by the following method:

Tungsten carbide powder or a powder mixture of tungsten carbide and cobalt which is carbon deficient can be be blended with tungsten carbide or a cobalt/tungsten carbide powder mixture which contains a theoretical amount or a slight excess of carbon over that required to form tungsten monocarbide, and then the blend is consolidated at high temperature. For example, the carbon deficient powder can be a mixture of tungsten carbide and cobalt which has been milled to develop a specific surface area in excess of three square meters/gram which is permitted to absorb oxygen; this can be blended with a powder which is not carbon deficient, such as a milled powder of the tungsten carbide and cobalt of the prior art commonly used for producing cemented tungsten carbide bodies with an atomic ratio of carbon to tungsten of from 1.0 to 1.03, as commonly employed in carbide cutting tools. The carbon deficient powders can also be prepared by ballmilling a composition of cobalt and tungsten carbide along with finely divided tungsten powder to provide the carbon deficiency; this powder can be blended as described with a powder which is not carbon deficient. Powders having carbon:tungsten ratios as low as 0.80 and as high as 1.1 are suitable for use in preparing these powder mixtures and of course more than two varied powders can be used.

Identification of the heterogeneous regions is sometimes difficult. However, by metallographic procedures, X-ray diffraction analysis, electrical resistivity measurements and Curie temperature measurements, regions high in carbon and cobalt regions low in tungsten can be identified in the presence of regions low in carbon, and cobalt regions high in tungsten. Methods for carrying out these analyses are described in application Ser. No. 835,817 referred to above.

Heterogeneity preferably occurs only on a microscopic scale, but may occur in regions as large as a tenth of a millimeter. Thus, 50 micron-sized granules of cobalt/tungsten carbide powder which have been heated in hydrogen at 900° C. and have a carbon:tungsten ratio of 0.95 can be blended with granules of a similar powder which have been heated in hydrogen containing enough methane to deposit a small amount of free carbon and have a carbon:tungsten ratio of 1.03. Polished cross-sections of consolidated bodies made from such mixed powders show localized regions high and low in carbon, about 50 microns in size, corresponding to the size of granules of the respective powders.

Preferred powders are those which produce bodies in which the heterogeneous regions are so fine and intermixed that they cannot be identified under the microscope but are still known to be present from either X-ray diffraction patterns of the cobalt phase or from the fact that the acid resistance is lower than that of a similar body having the same degree of porosity in which there is the same overall concentration of tungsten in cobalt, but the tungsten is homogeneously distributed. Homogeneous distribution of tungsten in cobalt is attained when steps are taken to eliminate the causes of heterogeneity as described above or when samples are heated for a long time at high temperature.

(5) Reducing the powder

When the dried milled mixture of tungsten carbide and cobalt contains over about 0.1 percent by weight of free carbon or more than about 0.5 percent by weight of oxygen, it is preferred to remove these impurities by treatment at a minimum elevated temperature in a very slightly carburizing atmosphere. Under these conditions extreme local variations in carbon to tungsten ratio are corrected, but the desirable variations within the limits of the present invention are not affected.

Oxygen as well as excessive free carbon can be removed during this purification, and at the same time the combined carbon content can be adjusted, all by heating the powder in a stream of hydrogen containing a carefully regulated concentration of methane. The powder can be charged to shallow trays made from a high temperature alloy, such as Inconel, and the trays loaded directly from the inert atmosphere environment to a tube furnace also made from Inconel or some similar high temperature alloy.

The powder in a stream of the reducing gas is brought to a temperature ranging from 750° to 1000° C., depending on the metal content of the powder, in from three to five hours, taking half an hour to raise the temperature the last hundred degrees. For a cobalt content of about 1%, 1000° C. is used, and for powders containing 12% cobalt, the temperature is 800°–900° C.

The reducing gas should consist of a stream of hydrogen containing methane and about 10 percent of inert carrier gas such as argon. Thus, at 1000° C. the stream should contain 1 mole percent of methane in hydrogen; at 900° C., 2 mole percent of methane; and at 800° C., 4 mole percent of methane in the hydrogen. The reduction/carburization at the maximum temperature is carried on for a period of 0.5 to 3 hours, and after cooling to room temperature under argon the powder is discharged to an inert atmosphere environment where it is screened through a seventy mesh screen. If desired this powder can be stored for extended periods in sealed containers or it can be used directly in the next step of this process.

Care must be employed to assure that in the reduction/carburization step an excess of methane is avoided so that an undesirable amount of free carbon is not introduced into the powder. It is to be noted that although the reaction conditions are such that free tungsten metal would ordinarily be converted to tungsten carbide, nevertheless very finely divided tungsten carbide used in this invention remains slightly deficient in carbon and is not carburized completely to a stoichiometric ratio for tungsten carbide.

For compositions in which the desired atomic ratio of carbon:tungsten is less than about 0.97, and where oxygen is to be removed by the foregoing reduction step, methane or other carburizing environments should be avoided and only hydrogen used. Generally speaking, with compositions of higher cobalt content, lower atomic ratios of carbon:tungsten can be employed. However, the minimum average atomic ratio of carbon:tungsten, $R_{Min}$, is found to be $$M_{Min} = 1.0 - 0.0062(P-1)$$

where P is percent by weight of cobalt.

An optimum ratio will be between this minimum and 1.02. Thus, for a composition containing 10% by weight of cobalt, for example, the minimum ratio is about 0.94. For a body containing 25% cobalt, the minimum ratio is about 0.85. A ratio above 0.90 is preferred. A maximum ratio, $R_{max}$ for most purposes is $$R_{max} = 1 - 0.00166(P-15)$$

For a composition containing 3% cobalt the maximum ratio is about 1.02.

(6) Consolidation of the powder

Generally speaking, consolidation is carried out in the manner described in Meadows U.S. Pat. No. 3,451,791, referred to above, i.e. by heating and compressing the powders.

It is important that when the powder composition is being heated for the first time it should not be subjected to excessive pressure or mechanical constraint, especially when in a graphite or carbon container. Pressure can be applied providing it is not sufficient to keep the sintering billet in intimate contact with the graphite walls of he mold. With some powders, a pressure of up to 1000 p.s.i. can be applied during the heating step, since even under such pressure the billet shrinks away from the mold and is not seriously carburized. The harm that is caused by excessive compression may be due either to shearing forces which disturb the internal structure of the composition at the beginning of recrystallization and sintering, or it may be due to chemical effects from contact with material such as graphite which is ordinarily used to apply the pressure. Thus it has been observed that application of pressure to the composition while in an alumina mold is less harmful to the resultant bodies, even using pressures higher than 1000 p.s.i. The harm also may be due to trapping of gases in pores that are collapsed by the pressure. In the absence of pressure such pores would not normally become closed at this stage of sintering.

If the powder is first heated without application of pressure to a prescribed temperature it can thereafter be consolidated to density and molded by hot pressing in a carbon mold without absorbing undesirable amounts of carbon. We have found that after the tungsten has dissolved in the cobalt phase during the heat treatment it is much less readily carburized.

Heat treatment is carried out in an inert atmosphere or in a vacuum. An inert atmosphere is one that does not react with the powder, such as argon or hydrogen. Heat treatment is carried out at a temperature $T_s$ which is above 1000° C. but generally below the final consolidating temperature, $T_m$, and the treatment lasts for about $t_s$ to $20t_s$ minutes, where:

$$\log_{10} t_s = \frac{13250}{T_s + 273} - 8.2 \text{ minutes}$$

and $$T_m = \frac{6.5 - \log_{10}(P-0.3)}{0.0039} \pm 100° \text{ C.}$$

where P=percent by weight of metal in the composition.

Thus the composition is heated to temperature $T_s$ and held for a minimum of $t_s$ minutes. The maximum time of heating is not critical at temperatures below which no appreciable grain growth of tungsten carbide occurs, namely below about 1200° C. However, above 1200° C., the time should not exceed about $20t_s$. For example, at 1000° C., it is necessary to heat for at least 2½ hours and preferably several times this long; at 1100° C. the composition is heated for at least 13 minutes; at 1200°

C. the hold time is a minimum of about 5 minutes and not over two hours; at 1400° C. the hold time is less than 10 minutes, and at 1500° C. it is less than 4 minutes.

It should be noted that the temperatures and times required vary to some extent with the size of samples, dimensions of equipment, heating rates attainable and the like. For example, it is possible to carry out the heating step either on loose powder or preconsolidated billet while the sample is being heated to the temperature at which it is to be finally consolidated. Such heating should be carried out rapidly in the range above 1200° C., providing the sample is heated relatively uniformly throughout its volume. An integrated combination of temperatures and times equivalent to the fixed times and temperatures described, is in keeping with the spirit of the invention, and will be apparent to those skilled in the art.

A preferred method of fabrication is by hot pressing the powders in the manner described below. Various types of hot pressing equipment are known in the art. Depending on press design and desired operating characteristics, heating can be by resistance heating, induction heating, or plasma torch heating. Short heating times of a few seconds duration are attainable by resistance sintering under pressure.

Temperature can be meausred very near the sample itself by means of a radiation pyrometer and can be crosschecked for accuracy with an optical pyrometer. Such instruments should be calibrated against primary standards and against thermocouples positioned in the sample itself so that actual sample temperatures can be determined from their readings. Automatic control of heat-up rate and desired temperature can be achieved by appropriate coupling mechanisms between a radiant pyrometer and the power source.

The mold can be of a variety of shapes but is usually cylindrical, with a wall thickness of up to an inch or more. It is particularly advantageous to use a cylinder with a cross-section which is circular on the outside and square in the inside in pressing bodies to be used as cutting-tip inserts, thereby fabricating them as near as possible to their final desired dimensions.

As an example, for a 1 inch in diameter finished pressed round disc, the shell is cylindrical, 1 inch in inside diameter, 1½ inches in outside diameter, 4 inches in length. Thin graphite discs ¼ inch in thickness and 1 inch in diameter are loaded in the cylinder on top and bottom of the material to be pressed. The surface of the graphite discs in contact with the sample can have a conical depression ⅛ inch in diameter at the center to form a tip on the sample and keep it positioned in the center of the mold when it shrinks away from the sides due to sintering. Graphite pistons 1 inch in diameter and 2 inches long are loaded in both ends of the cylinder in contact with the ¼ inch discs and protruding from the cylinder.

Graphite parts used in the press tend to oxidize at the pressing temperatures used, and it is therefore necessary to maintain a non-oxidizing atmosphere or vacuum within the press. In addition to prolonging the life of the graphite parts, the use of a vacuum or an inert atmosphere makes it possible to remove the mold containing the hot pressed body from the heart of the induction heated furnace and cool the sample much more quickly than if it were left to cool in the hot zone of the furnace after shutting off the power. The press can be arranged to permit the mold to be removed from the hot furnace, and when this is done the mold cools very rapidly by radiation. Thus the mold described above, removed from the furnace at 1400° C., cools to dull red heat, about 800° C., in about 3 minutes.

Powders which are pyrophoric or absorb oxygen upon exposure to air, should be loaded into the mold in a nonoxidizing atmosphere, for example in a glove box filled with inert gas. The appropriate discs and pistons can then be inserted and the loaded mold can be handled with the contained powder essentially loosely packed or, for example, with no more pressure than can be applied to the pistons with the fingers. However, it is often convenient to apply about 200 to 400 p.s.i. pressure with a small press, to give a more compacted sample for greatest ease in handling.

In a preferred aspect of this invention, a cobalt/colloidal tungsten carbide powder mixture is pressed at about 200 p.s.i. as it is loaded into the mold, it is then brought to the maximum temperature with no pressure on the pistons, and held for 2 to 5 minutes at maximum temperature before applying any pressure. During the period at maximum temperature with no pressure applied, the body shrinks due to sintering. At the end of the period, the body attains 80–90% of theoretical density and its diameter is about 60% of the mold diameter. The pressure is then applied, reaching maximum in 15 to 30 seconds, and the presintered body is reformed into conformity with the mold. Maximum pressure and temperature are applied until complete densification is attained, as indicated when movement of the rams ceases. This ordinarily does not require more than 5 minutes, and usually only one minute, after which the sample is immediately removed from the hot zone and permitted to cool rapidly by radiation to below 800° C. in about five minutes or less. The sample is preferably cooled at a rate in excess of 10° C. per minute.

The conditions which give rise to the preferred dense cobalt-bonded bodies are quite important and should be precisely established for the particular composition and the type of structure desired.

Unduly long presintering times before application of pressure can be harmful due to excessive crystallite growth and the development of too extensive and rigid a crosslinked carbide structure. Too early an application of pressure can also be harmful as pointed out above. Holding the sample for too long a time at maximum temperature should also be avoided, not only because of a tendency towards carburization but also because secondary crystallite growth tends to cause a coarsening of the structure and eventually the development of porosity. Cooling too slowly can also be detrimental if the sample remains at high temperature long enough for undesirable crystallite growth and structural changes to occur. These structural changes can include changes in the composition of the cobalt binder phase. Thus with a low carbon content and the corresponding large amount of tungsten initially in the cobalt phase, precipitation of eta phase occurs at elevated temperatures. This can be minimized by brevity of hot pressing and rapidity of cooling of the pressed product. Generally speaking, it is undesirable to have more than about 20% by weight of eta phase in the binder, and it is preferred to have less than 5% eta phase in the binder.

While it is preferred that the products of this invention be made by heating and sintering lightly compacted finely divided cobalt/tungsten carbide powders, followed immediately by application of pressure, it is sometimes desirable to carry out the sintering step as a separate operation.

Thus, in order to achieve maximum productivity from a hot press, the initial sintering step can be carried out in a separate furnace in an inert atmosphere. This can be accomplished in several ways. For example, the starting powder can be loaded or lightly compacted into molds to be later used for hot pressing, and then heated rapidly in an inert atmosphere to a temperature within from 50 to 200° of the final hot pressing temperature to be employed. The mold and its partially sintered contents, while still hot, can be passed directly into a hot pressing operation.

The maximum temperature at which the bodies should be pressed is largely dependent on the cobalt content, although the proper temperature is to some extent dependent on the size of the molded piece, the heating rate, and the available pressure as well. The compositions of this invention are conveniently subjected to a temperature of $T_m$ for a period of $t_m$ to $20 t_m$ minutes, where $$T_m = \frac{6.5 - \log_{10}(P-0.3)}{0.0039} \pm 100° \text{ C.}$$

and $$\log_{10} t_m = \frac{13250}{T_m + 273} - 8.2 \text{ minutes}$$

where P is the precent by weight of metal in the composition.

Thus, for compositions containing 6% cobalt $T_m$ is about 1450° C., and for compositions containing 12% cobalt, $T_m$ is about 1400° C.

It is preferred to bring the sample to the desired temperature as rapidly as possible. For example, a sample 1 inch in diameter can be heated to 1400° C. in 4 to 5 minutes, or to 1850° C. in 6 to 7 minutes, by introducing the mold into a preheated graphite block, the limiting factor being the rate of heat transfer from the graphite equipment via the mold to the sample. Rapidity of heating is especially important in compositions which have an atomic ratio of carbon:tungsten close to 1.0.

Pressure can be applied to the cobalt/tungsten carbide composition in a hot press through the action of remotely controlled hydraulic pneumatic rams. Applying pressure simultaneously through two rams to the top and bottom gives more uniform pressure distribution within the sample than does applying pressure through only one ram. An indicator can be attached to each ram to show the amount of ram movement, thereby allowing control of sample position within the heat field and indicating the amount of sample compaction. The end section of the rams, which are exposed to the high temperature zone should be made from graphite.

A variation of 100° from the mean specified temperature provides to some extent for the variables mentioned above. Thus, in order to attain temperature equilibrium in the interior without overheating the exterior, larger bodies require a lower temperature, which also permits a longer heating time. Higher temperatures and shorter times can be employed when high molding pressures can be used and smaller molded bodies are being made.

The most important factor in determining consolidation conditions is the physical nature of the heat-treated composition of the invention. When the composition is a heat-treated powder, for example, it can be loaded into graphite molds and heat and pressure simultaneously applied until the material reaches the recommended temperature range, $T_m$ at which the pressure is maintained for the specified time. The required pressure may be as low as 100 to 200 pounds per square inch for compositions such as those containing 15 to 25 percent by weight of cobalt and which are soft at the pressing temperature. Several thousands of pounds per square inch is required for bodies containing one to three percent cobalt, although pressures of not more than 4000 pounds per square inch are usually used where operations are in graphite equipment.

For compositions containing from 5 to 12 percent cobalt the required pressure can also vary according to the physical nature of the composition. Thus if a sintered powder composition is used, which has been heat-treated at a temperature $T_s$ close to the maximum allowable temperature $T_m$, a high pressure such as 4000 p.s.i. is preferably applied over a prolonged period, often continuously, while the mass is heated from 1000° C. to temperature $T_m$.

On the other hand, if degassed powder is preconsolidated to relatively high density such as about 50 percent of theoretical density, so that voids or pores larger than about ten microns are eliminated, and this compact is then heat-treated at temperature $T_s$, it shrinks spontaneously to a coherent body. If $T_s$ is then raised to $T_m$, sintering continues and a relatively dense body is obtained which can then be molded by brief application of pressure at temperature $T_m$.

Compositions of the invention require application of pressure at the defined maximum temperature, $T_m$, to eliminate voids. In such instances the consolidation is carried out until the body reaches a density of greater than 98% and preferably greater than 99 percent of theoretical, corresponding to a porosity of less than one percent by volume. However, for many uses even this degree of porosity may be too high. The porosity of the bodies of this invention is characterized by preparing polished cross-sections of the bodies for examination under a metallurgical microscope. Pores observed in this way are classified according to a standard method recommended by the American Society for Testing Materials (ASTM) and described on pp. 116 to 120 in the book entitled "Cemented Carbides," published by the MacMillan Company of New York (1960). Thus, bodies of this invention are preferably pressed until a porosity rating of A–1 is obtained especially where the material is to be subjected to heavy impact or compression. This corresponds to a density of essentially 100% of theoretical or a volume porosity of about 0.1%. However, porosities as great as A–3 or A–4 are suitable for many uses, since such bodies nevertheless have very high transverse bending strength. Even a porosity rating of A–5 corresponds to a density of about 98 percent and a porosity around 2 percent, is acceptable for the dense compositions.

Pressures of from 500 to 6000 p.s.i. can be used in graphite equipment, but generally speaking not over 4000 p.s.i. can be applied without danger of breaking the equipment, unless the graphite mold and plungers are reinforced with a refractory metal such as tungsten or molybdenum.

Instead of loading a powder into a mold, preconsolidated compacts in the form of billets can be prepared and heat-treated and then loaded in a mold for hot pressing. Such heat-treated, sintered billets can also be shaped by rolling or forging in an inert atmosphere.

After final consolidation to a dense billet the compositions of this invention can be further shaped by bending, swaging, or forging at about temperature $T_m$. Similarly, pieces can be welded together by bringing two clean surfaces together under pressure.

UTILITY

Some of the products of this invention are extremely dense, impact resistant, wear resistant, extremely hard, and are very strong. They are therefore suitable for use in the numerous ways in which such refractory materials are conventionally used. Some of the other uses to which the products of this invention can be put include cutting tools, drilling bits, as binders or matrices for other hard abrasives, and many other specific uses apparent to those skilled in the art.

Products of this invention are used in tools in which unusual strength is required in combination with high hardness. They are particularly advantageous in tools in which conventional cobalt-bonded tungsten carbide tools fail by flaking, chipping, or cracking, such as in tools for form cutting, cut-off, milling, broaching and grooving. Thus they find extensive use where, because of the inadequacies of cobalt-bonded tungsten carbide of the prior art, high speed steel tools are still employed.

Because of the unusual fine grain size, products of this invention are useful in tools where extremely small cross-sections are encountered, as for example in rotary tools smaller than an eighth of an inch in diameter such as end mills, drills and routers; knives having a cutting edge with an included angle less than about 30°; and steel-cutting tools which cut with high rake angles such as broaches, thread chasers, shaving or planing tools, rotary drills, end mills, and teeth for rotary saws. While the products of this invention containing more than about 12% cobalt are not stronger than products of this invention containing from 5 to 12% cobalt, nevertheless, the impact strength and toughness is higher. These are generally useful where tool steels are normally employed, and have the advantage of higher hardness than tool steels.

The process of this invention is further illustrated in the following examples wherein parts and percentages are by weight unless otherwise noted.

EXAMPLE 1

This is an example of the invention in which heterogeneous distribution of tungsten in the cobalt phase is effected by blending two lots of reduced tungsten carbide-cobalt powder, one containing more and the other less carbon than required to furnish consolidated bodies of superior strength. The tungsten carbide employed is made as described in copending application, Ser. No. 772,810, filed Nov. 1, 1968.

By analysis this powder contains 5.23% total carbon, 0.06% free carbon and 1.18% oxygen. Thus the atomic ratio of chemically combined carbon to tungsten is 0.85.

The product gives the X-ray diffraction pattern of tungsten carbide and from the broadening of the X-ray lines, the average crystallite size is calculated to be 35 millimicrons. The specific surface area is 6.6 square meters/gram. Electron microscopic examination of the powder shows it to consist of porous aggregates of colloidal crystallites in the size range 20 to 50 millimicrons. The aggregates are mainly in the size range of from 1 to 10 microns, although some aggregates as large as 50 microns can be observed.

Incorporation of the cobalt bonding phase is accomplished by milling the cobalt in powder form with aggregated colloidal tungsten carbide powder prepared as described above. To an 8 inch diameter one gallon steel mill the following are charged: (a) 14,000 parts of "Carboloy" grade 883 cobalt bonded tungsten carbide cylinders, one-quarter of an inch in diameter, and one-quarter inch long, the rods being previously conditioned by tumbling for two weeks; (b) fifteen hundred parts of the aggregated colloidal tungsten carbide powder prepared above; (c) 205 parts of a fine cobalt powder, having a specific surface area of 0.7 square meter per gram and a grain size of about one micron. This charge occupies about half the volume of the mill. Milling under acetone is continued for 7 days by rotating the mill at 75 revolutions per minute, after which time the mill lid is replaced by a discharge cover and the contents are transferred to a container maintaining an atmosphere of nitrogen throughout the system while this is being done. Three portions of acetone of 395 parts each are used to wash out the mill. The solids in the drying flask are allowed to settle and the bulk of the acetone is siphoned off. The flask is then evacuated and when the bulk of the acetone is evaporated, the temperature of the flask is brought to 125° C., maintaining a vacuum of less than a tenth of millimeter of mercury. After about 4 hours, the flask is cooled, filled with pure argon and transferred to an argon glove box. In this inert environment the solids are removed from the drying flask and screened through a 70 mesh sieve.

The screened powder is charged to shallow trays which are then loaded directly from the argon filled box to a five inch diameter Inconel tube furnace, where the powder is brought to 900° C. at a uniform rate in about 3 hours. The gas passing through the furnace consists of hydrogen, at a flow-rate of four liters per minute, with methane introduced at a flow-rate of forty milliliters per minute. This treatment removes oxygen impurities, adjusts the carbon content and makes the powder less susceptible to reaction with air. The powder is held in this gas stream at 900° C. for two hours, then is cooled and passed through a 40 mesh per inch screen in an argon filled box. Samples are then under argon for analysis.

A second powder is similarly prepared from tungsten carbide containing 6.70% total carbon, 0.79% free carbon and 0.51% oxygen. Each powder contains 12.2% of cobalt. During the screening of the powders through a screen of 70 meshes per inch, the horizontal screen and attached receiving pan are vibrated in a direction parallel to the plane of the screen. The resulting screened powders are obtained in the form of spheres about 50 to 150 microns in size formed by aggregation of the much finer powder components. During the reduction step at 900° C., these spheres are slightly sintered and increase in strength so they can be tumbled in a mixer without breaking apart.

The first powder after reduction contains 4.54% total carbon, no free carbon and has an atomic ratio of carbon to tungsten of 0.85. When this powder is separately hot pressed in the manner described below, the resulting billet contains 10.96% cobalt and has an atomic ratio of carbon to tungsten of 0.83, a Rockwell A hardness of 91.9 and a transverse bending strength of only 404,000 p.s.i.

The second powder after reduction contains 5.53 percent total carbon, 0.14% free carbon, and an atomic ratio of carbon to tungsten of 1.03. When separately hot pressed as described below, it gives a billet containing 8.2 percent cobalt, 5.73 percent total carbon, and an atomic ratio of total carbon to tungsten of 1.03, a small amount of free carbon being present. The hardness is 92.0 on the Rockwell A scale and the transverse rupture strength is 375,000 p.s.i.

To prepare a composition of this invention, 25 parts of the first reduced powder and 75 parts of the second reduced powder are thoroughly blended by tumbling. Forty-five parts of this powder is charged in an oxygen-free environment to a cylindrical carbon mold and close-fitting carbon pistons are inserted in each end. The mold containing the powder is pressed at 200 p.s.i. and is then transferred to a vacuum hot press. After evacuation the sample, under no pressure, is brought to 1420° C. by induction heating in seven minutes and held at this temperature with no application of pressure for five minutes. During the heating the sample sinters and shrinks away from contact with the carbon surface, thus avoiding carburization.

Hydraulic pressure is then applied to both pistons and the pressure on the sample in the mold is brought to 4000 p.s.i. in a period of half a minute. The sample is subjected to a pressure of 4000 p.s.i. at 1420° C. for one minute at which time no further movement of the pistons is observed. The mold containing the sample is then ejected from the hot zone and allowed to cool to 800° C. in two minutes in the evacuated chamber of the press. After cooling to less than 100° C., the mold is removed from the vacuum chamber and dense sample in the form of a cylindrical disc or billet, 1 inch in diameter and a quarter of an inch thick, is recovered. Analysis shows this billet containing 9.2% cobalt, 5.49% total carbon, an atomic ratio of total carbon to tungsten of 0.99, a hardness of 91.6 on the Rockwell A scale, and a transverse bending strength of 540,000 p.s.i. The microstructure shows regions in which the grain size of tungsten carbide is less than one micron, interspersed with regions containing some coarse tungsten carbide two or three microns by 8 microns in cross-section. The latter coarseness is indicative of regions in which the atomic ratio of carbon to tungsten is about 1.0.

The acid resistance for this product measured as described in Meadows U.S. Pat. No. 3,451,791 is 18 hours. By analysis of the strongest X-ray diffraction line of cobalt, regions of cobalt are found to be present, containing 17.2%, 14.3%, 11.4%, and 7.5% tungsten, respectively. An average value of 14% tungsten in the cobalt is observed. A photomicrograph of a polished cross-section of the composition, etched lightly to reveal the tungsten carbide grains shows the presence of carbon particles in the structure. However, there are regions from 10 to 50 microns in diameter, comprising about a quarter of the area of a typical cross-section, that are free from carbon and in which the tungsten carbide grains are smaller than 2 microns. These are the portions of the structure which are derived from the carbon-deficient powder. At high magnification the carbon particles appear as irregular clusters, one or two microns in size, and in the regions of the cross-section where they are present, they are 10 to 30 microns apart. There are also pores in the areas containing free carbon, these being distinguished as separate rounded solid black areas; in these regions a substantial portion of the tungsten carbide grains are from 2 to 10 microns in size.

The composition is found to be not only very strong, but also very resistant to chipping under impact, being equal in this respect to many tungsten carbide bodies of the prior art which contain more cobalt, and thus have a hardness of less than $R_A = 90$. The composition is fabricated into an insert for a cut-off tool and used on a screw machine for cutting off stainless steel parts without chipping under conditions where most carbide tools of the prior art chip and break.

EXAMPLE 2

This is an example of the preparation of a product of this invention by starting with two different tungsten carbide powders, one containing more carbon than the other. The tungsten carbide powders are prepared in the same manner as that of Example 1, by incorporating different amounts of carbon in the synthesis. Both powders consist of porous aggregates from 1 to 10 microns in size, of colloidal crystallites of tungsten carbide about 40 millimicrons in average diameter.

The first tungsten carbide powder is low in carbon, the total carbon content being 6.07%. The powder contains 0.09% free carbon and 0.36% oxygen. The second tungsten carbide powder contains 6.19% total carbon, 0.12% free carbon, and 0.43% oxygen.

Equal parts of each of these two powders are ballmilled with sufficient cobalt powder as in Example 1 to provide a mixture containing 12.4% of cobalt. The resulting milled and dried powder is reduced also as in Example 1. The reduced powder contains 5.28% total carbon, less than 0.01% free carbon, 0.23% oxygen and has an atomic ratio of carbon to tungsten of 0.985.

A billet one inch in diameter and a quarter of an inch in thickness is pressed by the procedure described in Example 1, resulting in a very strong composition containing 8.61% of cobalt, 5.45% of carbon, and an atomic ratio of carbon to tungsten of 0.97.

The hardness of this composition is 92.0 on the Rockwell A scale, and the transverse rupture strength is 593,000 p.s.i. The distribution of tungsten in the cobalt phase shows the presence of regions containing approximately 20, 10 and 3% of tungsten. A more sensitive procedure shows that the major region containing an average of 20% tungsten is an average for regions containing 26.0%, 21.5% and 17.2%; the 10% region is 11.4%, and the 3% region is an average of 5.0% and 1.5% regions.

The microstructure shows most of the tungsten carbide grains are under one micron in size and the average grain diameter is less than one micron. Regions about 10 microns in area and about 20 to 50 microns apart are present contain coarser tungsten carbide grains up to 5 microns in size. No eta phase is present and no carbon particles evident in micrographs of polished sections.

The composition is converted into twist drills 0.060 inch in diameter and used for drilling electronic circuit boards without breaking.

EXAMPLE 3

This is an example of this invention in which two heat-treated and reduced powders, similar to those described in Example 1, are mixed. The powders differ not only in the ratio of carbon to tungsten, but also in cobalt content. Thus, the first powder is prepared from colloidal tungsten carbide similar to that of Example 1, except that it is more deficient in carbon, containing an overall atomic ratio of total carbon to tungsten of 0.93. This is admixed with cobalt to produce a composition containing 6% of cobalt, and is then ballmilled, screened on a vibratory machine to aggregate the powder in the form of spheres about 60 microns in average diameter, and reduced as in Example 1 at 900° C. The resulting powder contains no free carbon and the atomic ratio of total carbon to tungsten is 0.95.

A second powder is prepared identical with the second powder of Example 1, containing 12% of cobalt, an overall atomic ratio of total carbon to tungsten of 1.03, and containing 0.14% of free carbon in the form of particles smaller than 3 microns uniformly distributed through the mass. It is reduced at 900° C., as in Example 1. The reduced powder consists of small spherical aggregates of the same size as those of the first powder.

Equal parts of these two powders are thoroughly blended in a mechanical tumbler. The mixture is loaded into a graphite mold without compaction, and heated to 1400° C. over a period of about 20 minutes in a vacuum. At this point, 2000 pounds per square inch pressure is applied to a graphite piston compressing the powder into the mold for one minute. The mold and contents are then removed from the heated zone of the furnace and permitted to cool under vacuum, the temperature of the mold dropping to less than 800° C. in 15 minutes. The hot-pressed composition has a transverse rupture strength of 510,000 pounds/square inch and a Rockwell A hardness of 92.7, thus combining very high hardness with very high strength. The resistance to chipping is much greater for this product than that of standard compositions of the prior art containing 9% cobalt, as shown by using milling cutter inserts of this material for face milling rough cast iron engine blocks. The cobalt binder on the average contains 20% of tungsten, which in different regions ranges from 5% to 25%. The atomic ratio of carbon to tungsten is 0.98. The microstructure examined in a polished cross-section indicates that the body consists of interpenetrating networks of regions low in cobalt and high in tungsten carbide, containing no free carbon, and regions high in cobalt and lower in tungsten carbide containing particles of carbon about one micron in size and about 10 to 30 microns apart. The overall cobalt content of the hot pressed body is 8.1%.

We claim:

1. A process for preparing a dense body of tungsten carbide bonded with from 3 to 25% by weight of a heterogeneous cobalt-tungsten alloy, said alloy consisting essentially of cobalt and an average of from 5 to 25% by weight of tungsten, and said alloy comprising regions containing less than 8% by weight of tungsten interspersed with regions containing more than 8% by weight of tungsten, the process comprising the steps of:
   (a) intimately mixing cobalt, a carbon-deficient tungsten carbide powder and a tungsten carbide powder which is not carbon-deficient, the carbon:tungsten ratio of the powders ranging from 0.80 to 1.1;
   (b) heating the mixture in an inert atmosphere at a temperature $T_s$ between 1000° C. and $T_h$ ° C. for from $t_s$ to $20 t_s$ minutes where $$\log_{10} t_s = \frac{13250}{T_s + 273} - 8.2$$

and $$T_h = \frac{6.5 - \log_{10}(P - 0.3)}{0.0039}$$

wherein P = percent by weight of cobalt;
   (c) pressing the hot composition to a density in excess of 98% of theoretical in a heated zone at a temperature of $T_m$ for a time of from $t_m$ to $20 t_m$ minutes, where $$\log_{10} t_m = \frac{13250}{T_m + 273} - 8.2$$

and $$T_m = \frac{6.5 - \log_{10}(P-0.3)}{0.0039} \pm 100°\ C.$$

(d) cooling the pressed composition at a rapid rate.

2. The process of claim 1 wherein the cooling rate is in excess of 10° C. per minute.

References Cited

UNITED STATES PATENTS

| | | | |
|---|---|---|---|
| 873,745 | 12/1907 | Haynes | 75—171 |
| 1,057,423 | 4/1913 | Haynes | 75—171 |
| 1,338,132 | 4/1920 | Honda | 75—171 |
| 1,951,133 | 3/1934 | De Bats | 23—208 |
| 1,998,609 | 4/1935 | Comstock | 75—204 |
| 2,011,369 | 8/1935 | McKenna | 29—182.8 |
| 2,113,171 | 4/1938 | Cooper | 29—182.8 |
| 2,116,399 | 5/1938 | Marth | 75—204 |
| 2,122,403 | 7/1938 | Balke | 29—182.7 |
| 2,731,711 | 1/1956 | Lucas | 29—182.8 |

FOREIGN PATENTS 1,041,958  9/1966  Great Britain.

OTHER REFERENCES

Metals Handbook, 1948, editor, American Society for Metals, Novelty Park, Ohio, p. 63.

BENJAMIN R. PADGETT, Primary Examiner

A. J. STEINER, Assistant Examiner

U.S. Cl. X.R.

75—211, 214, 226, 227